(12) United States Patent
Reel

(10) Patent No.: US 8,746,800 B2
(45) Date of Patent: Jun. 10, 2014

(54) VEHICLE HEAD RESTRAINT ASSEMBLY

(75) Inventor: Travis M. Reel, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 13/215,798

(22) Filed: Aug. 23, 2011

(65) Prior Publication Data

US 2013/0049428 A1   Feb. 28, 2013

(51) Int. Cl.
*A47C 7/36* (2006.01)
*B60N 2/48* (2006.01)

(52) U.S. Cl.
CPC ............ *B60N 2/4808* (2013.01); *B60N 2/4864* (2013.01)
USPC .......................................... 297/410; 297/404

(58) Field of Classification Search
USPC ..................... 297/404, 409, 410, 391, 216.12
See application file for complete search history.

(56) References Cited

U.S. PATENT DOCUMENTS

| | | | |
|---|---|---|---|
| 638,534 A | 12/1899 | Welch | |
| 1,471,168 A * | 10/1923 | Katz | 297/404 |
| 1,639,194 A | 8/1927 | Lasater | |
| 1,746,091 A | 2/1930 | Skidmore | |
| 1,957,608 A | 5/1934 | McCann | |
| 2,869,621 A | 1/1959 | Zukor | |
| 3,029,107 A * | 4/1962 | Myers | 297/399 |
| 3,157,434 A | 11/1964 | Gianvecchio | |
| 3,190,686 A | 6/1965 | Smiler | |
| 3,369,786 A | 10/1965 | Schloemer | |
| 3,655,241 A | 4/1972 | Herzer et al. | |
| 4,191,422 A | 3/1980 | Inasawa et al. | |
| 4,762,367 A * | 8/1988 | Denton | 297/409 |
| 4,856,818 A | 8/1989 | O'Sullivan et al. | |
| 4,856,848 A * | 8/1989 | O'Sullivan et al. | 297/391 |
| 5,669,666 A | 9/1997 | Lee | |
| 5,967,613 A | 10/1999 | McKeever | |
| 6,616,236 B1 * | 9/2003 | Su | 297/410 |
| 6,983,995 B1 | 1/2006 | Weine et al. | |
| 2004/0124686 A1 | 7/2004 | Malsch et al. | |
| 2006/0119150 A1 * | 6/2006 | Hoffmann | 297/216.12 |
| 2007/0246989 A1 * | 10/2007 | Brockman | 297/391 |
| 2009/0058162 A1 | 3/2009 | Boes et al. | |
| 2013/0002000 A1 * | 1/2013 | Delling et al. | 297/391 |

FOREIGN PATENT DOCUMENTS

JP      6-278514      10/1994

* cited by examiner

*Primary Examiner* — David R Dunn
*Assistant Examiner* — Alexander Harrison
(74) *Attorney, Agent, or Firm* — Rankin, Hill & Clark LLP

(57) ABSTRACT

A vehicle head restraint assembly includes a head restraint body for providing support to a vehicle occupant's head and a lower frame assembly for mounting the head restraint body to an associated vehicle structure. The head restraint body is longitudinally adjustable relative to the lower frame assembly. An upper frame assembly can be secured to the head restraint body and movably secured to the lower frame assembly for longitudinally adjusting the head restraint body relative to the lower frame assembly.

14 Claims, 10 Drawing Sheets

VEHICLE HEAD RESTRAINT ASSEMBLY

BACKGROUND

The present disclosure generally relates to vehicle head restraint assemblies, and particularly relates to a longitudinally adjustable head restraint assembly for a vehicle.

Vehicle head restraints are provided in vehicles to provide support to an occupant's head, particularly in the case of a vehicle collision. Head restraints are usually provided so as to extend above a seat back of a vehicle seat. Most head restraints are adjustable in a vertical direction but are not typically adjustable in a longitudinal direction, i.e., in a direction of travel for the vehicle. Instead of longitudinal adjustment, most vehicle head restraints are positioned so as to be close to the occupant's head to ensure appropriate dynamic performance for the average person. Unfortunately, such orientation can make some vehicle occupants uncomfortable as the head restraint can feel as though it is pushing the occupant's head forward. There are a few known head restraints that are adjustable in the longitudinal direction. However, these are often complicated and/or cumbersome.

SUMMARY

According to one aspect, a vehicle head restraint assembly includes a head restraint body for providing support to a vehicle occupant's head and a lower frame assembly for mounting the head restraint body to an associated vehicle structure. The head restraint body is longitudinally adjustable relative to the lower frame assembly.

According to another aspect, a longitudinally adjustable head restraint assembly for a vehicle includes a head restraint body having an upper frame assembly, and a lower frame assembly for mounting the head restraint body. The upper frame assembly is longitudinally adjustable relative to the lower frame assembly for longitudinally adjusting the head restraint body.

According to still another aspect, a head restraint assembly for a vehicle includes a head restraint body for supporting a vehicle occupant's head, an upper frame assembly disposed at least partially within the head restraint body, and a lower frame assembly for mounting the head restraint body and the upper frame assembly to a vehicle seat. The upper frame assembly is movably mounted to the lower frame assembly for longitudinally adjusting a position of the head restraint body relative to the vehicle seat.

DETAILED DESCRIPTION

Figure 1:
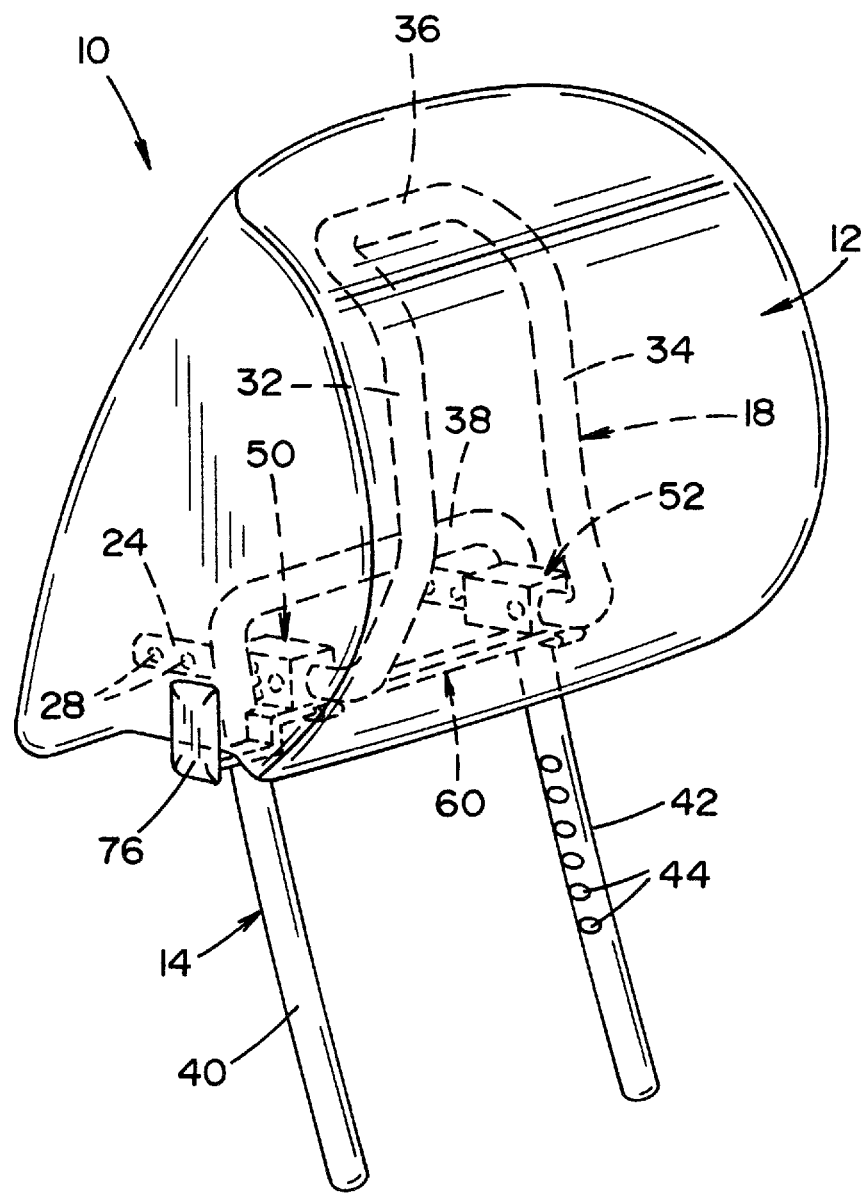
FIG. 1 is a perspective view of a longitudinally adjustable vehicle head restraint assembly including a head restraint body having an upper frame assembly and a lower frame assembly having a locking device for locking a longitudinal position of the head restraint body.

Referring now to the drawings, wherein the showings are for purposes of illustrating one or more exemplary embodiments and not for purposes of limiting the same, FIG. 1 shows a longitudinally adjustable head restraint assembly for a vehicle generally indicated by reference 10. The illustrated vehicle head restraint assembly 10 includes a head restraint body 12 for providing support to a vehicle occupant's head (not shown). The head restraint assembly 10 further includes a lower frame assembly 14 provided for mounting the head restraint body 12 to an associated vehicle structure (e.g., vehicle seat 16 shown in FIGS. 3 and 4). As will be described in more detail below, the head restraint body 12 is longitudinally adjustable relative to the lower frame assembly 14.

The head restraint assembly 10 also includes an upper frame assembly 18 secured to the head restraint body 12 and movably secured to the lower frame assembly 14 for longitudinally adjusting the head restraint body 12 relative to the lower frame assembly 14. In particular, in the illustrated embodiment, the upper frame assembly 18 is longitudinally adjustable relative to the lower frame assembly 14 for longitudinally adjusting the head restraint body 12. In the illustrated embodiment, the upper frame assembly 18 is disposed at least partially within the head restraint body 12.

Figure 2:
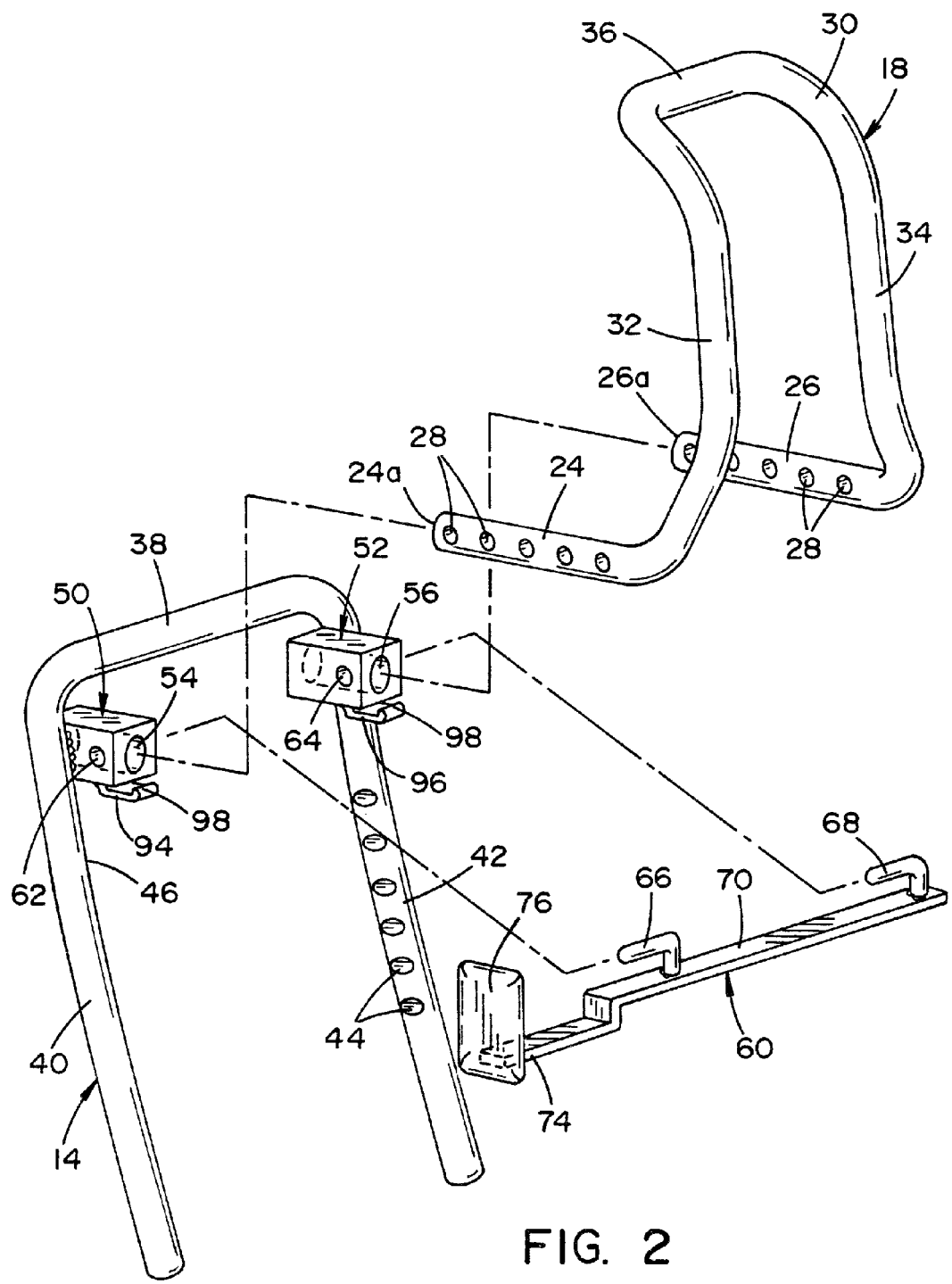
FIG. 2 is an exploded view of the upper frame assembly, the lower frame assembly, and the locking device.

With additional reference to FIG. 2, the upper frame assembly 18 includes at least one guided portion 24,26 having a plurality of positioning apertures 28 defined therealong corresponding to longitudinal positions of the head restraint body 12. In the illustrated embodiment, the upper frame assembly 18 includes a pair of spaced apart longitudinally elongated guided portions 24, 26 and the guided portions include corresponding pairs of positioning apertures 28 defined therealong. The guided portions 24, 26 can be connected together by a generally inverted U-shaped member 30 including leg portions 32, 34 and base or cross portion 36. As shown, the upper frame assembly 18 can be formed by a single member, such as the depicted member having a round cross section, though other shapes, configurations and compositions could also be used and the upper frame assembly 18 need not be formed by a single piece.

The lower frame assembly 14 can include at least one leg 40,42 for mounting the head restraint body 12 and the upper frame assembly 18 to the associated vehicle structure (e.g., vehicle seat 16). In the illustrated embodiment, the at least one leg of the lower frame assembly 14 is a pair of spaced apart vertically extending legs 40, 42, though this is not required. The legs 40, 42 depend from an underside of the head restraint body 12 when the lower frame assembly is movably secured to the upper frame assembly 18 to mount the head restraint body 12 to the associated vehicle structure. In the illustrated embodiment, the lower frame assembly 14 can be generally U-shaped with a base or cross portion 38 and the two spaced apart legs 40, 42 extending from the base portion 38.

At least one of the spaced apart legs 40,42 (e.g., leg 42 in the illustrated embodiment) can have a plurality of positioning apertures 44 defined therealong corresponding for adjusting a vertical position of the head restraint body 12 relative to the associated vehicle structure. The positioning apertures 44 can correspond to vertical positions of the head restraint body 12. While the apertures 44 are only defined in the leg 42 in the illustrated embodiment, it is to be appreciated that other configurations are possible (e.g., apertures could be provided in the leg 40 instead or in addition to the apertures 44 defined in the leg 42). The apertures 42 can be recesses, slots, detents or the like defined into the leg 42 for adjusting the vertical position of the head restraint body 12 relative to an associated vehicle structure, such as a vehicle seat 16, as is known and understood by those skilled in the art. Together, the base portion 38 in the legs 40, 42 form an inverted U-shaped member 46 that can be formed as described in reference to the U-shaped member 30, though this is not required and other configurations and constructions are contemplated.

The lower frame assembly 14 can additionally include at least one guide 50, 52 defining a guiding aperture 54, 56 for receiving the at least one guided portion 24, 26 of the upper frame assembly 18 to guide longitudinal movement of the head restraint body 12. In particular, in the illustrated embodiment, the at least one guide of the lower frame assembly 14 includes a pair of laterally spaced apart guides 50, 52 each defining a respective guiding aperture 54, 56. In particular, the guides 50, 52 of the illustrated embodiment define the guiding apertures 50, 52 as longitudinally elongated apertures or slot. As will be described in more detail below, the guided portions 24, 26 of the upper frame assembly 18 are respectively received in the guiding apertures 54, 56 of the guides 50, 52. In the illustrated embodiment, the guides 50, 52 are respectively disposed at or adjacent intersections of the base portion 38 and each of the spaced apart legs 40, 42. For example, as shown in the illustrated embodiment, the guides 50, 52 can be welded, respectively, to the legs 40, 42 adjacent the base portion 38.

As shown, each of the guides 50, 52 defines a respective guiding aperture 54, 56 that receives a respective guiding leg portion 24, 26 of the upper frame assembly 18. The guided leg portions 24, 26 are then longitudinally moveable along the guiding apertures 54, 56 and thus the guides 50, 52 to longitudinally adjust the head restraint body 12. In this manner, the upper frame assembly 18 is moveably mounted to the lower frame assembly 14 for longitudinally adjusting a position of the head restraint body 12 relative to an associated vehicle structure, such as vehicle seat 16.

Figure 3:
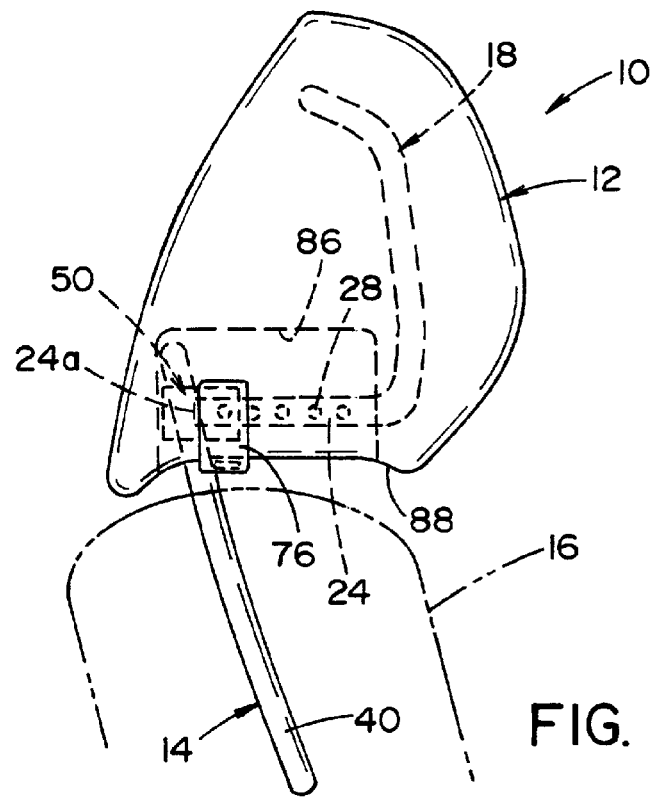
FIG. 3 is a side elevational view of the head restraint assembly shown with the head restraint body locked in a longitudinally forward-most position.
Figure 4:
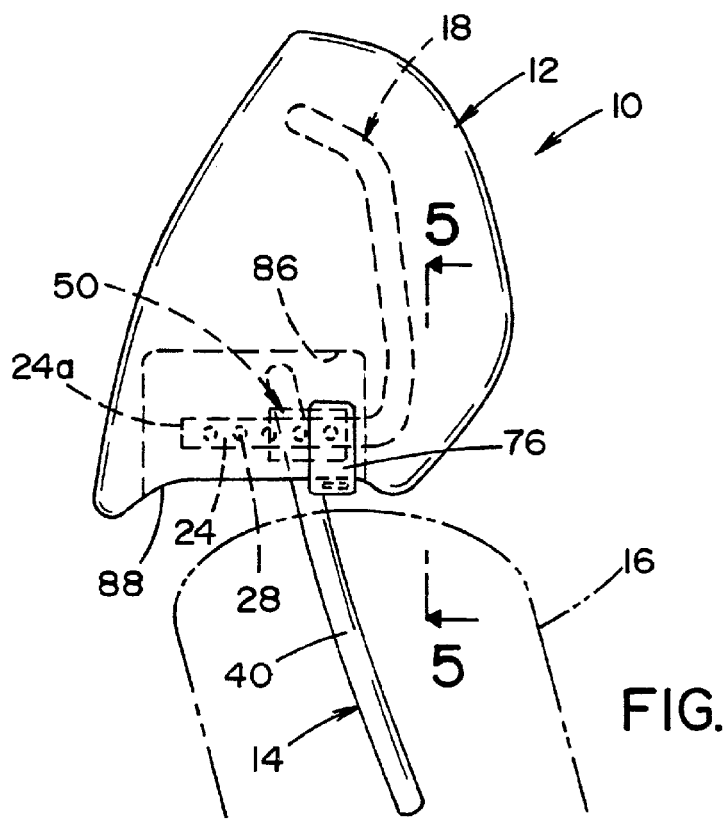
FIG. 4 is another elevational view of the head restraint assembly showing the head restraint body longitudinally locked in a rearward-most position.

Longitudinal movement of the head restraint body 12 having the upper frame assembly 18 mounted thereto is illustrated in FIGS. 3 and 4. More particularly, in FIG. 3, the head restraint body 12 is shown in its forward-most longitudinal position. In FIG. 4, the head restraint body 12 is shown in its rearward-most longitudinal position. More specifically, in FIG. 3, distal portions 24a, 26a of the upper frame assembly 18 (only distal portion 24a and guide 50 shown in FIGS. 3 and 4) are moved adjacent the guides 50, 52. In FIG. 4, the distal portions 24a, 26a are spaced apart from the guides 50, 52.

Advantageously, this arrangement allows an adjustment to be applied to the head restraint body 12 that enables the head restraint body 12 to have multiple forward/rearward longitudinal adjustments to improve comfort for a vehicle occupant. By the provision of a longitudinal adjustment for the head restraint assembly 10, the head restraint body 12 is adjustable according to vehicle occupant preferences and sizes and need not be fixed at a longitudinal position designated according to the average sized vehicle occupant. Longitudinal adjustment particularly allows the head restraint body 12 to be adjusted closer or farther away from a vehicle occupant's head to achieve a comfortable position.

The vehicle head restraint assembly 10 can additionally include a locking device 60 for longitudinally locking the head restraint body 12 and the upper frame assembly 18 relative to the lower frame assembly 14. In particular, the locking device 60 can lock the head restraint body 12 in one of a plurality of longitudinal positions by engaging one set of the plurality of positioning apertures 28 of the upper frame assembly 18. For such longitudinal locking, the at least one guide of the lower frame assembly 14 (i.e., guides 50 and 52 in the illustrated embodiment) can include a locking aperture (i.e., locking apertures 62, 64 in the illustrated embodiment) and the locking device 60 can include at least one locking portion 66, 68 received through the locking aperture of the at least one guide and into one of the plurality of positioning apertures 28 that is in registry with the locking aperture. More particularly, in the illustrated embodiment, the locking device 60 includes laterally spaced apart locking portions 66, 68 that are respectively received in select ones of the plurality of positioning apertures 28 defined along the laterally spaced apart guided portions 24, 26 of the upper frame assembly 18.

Figure 5:
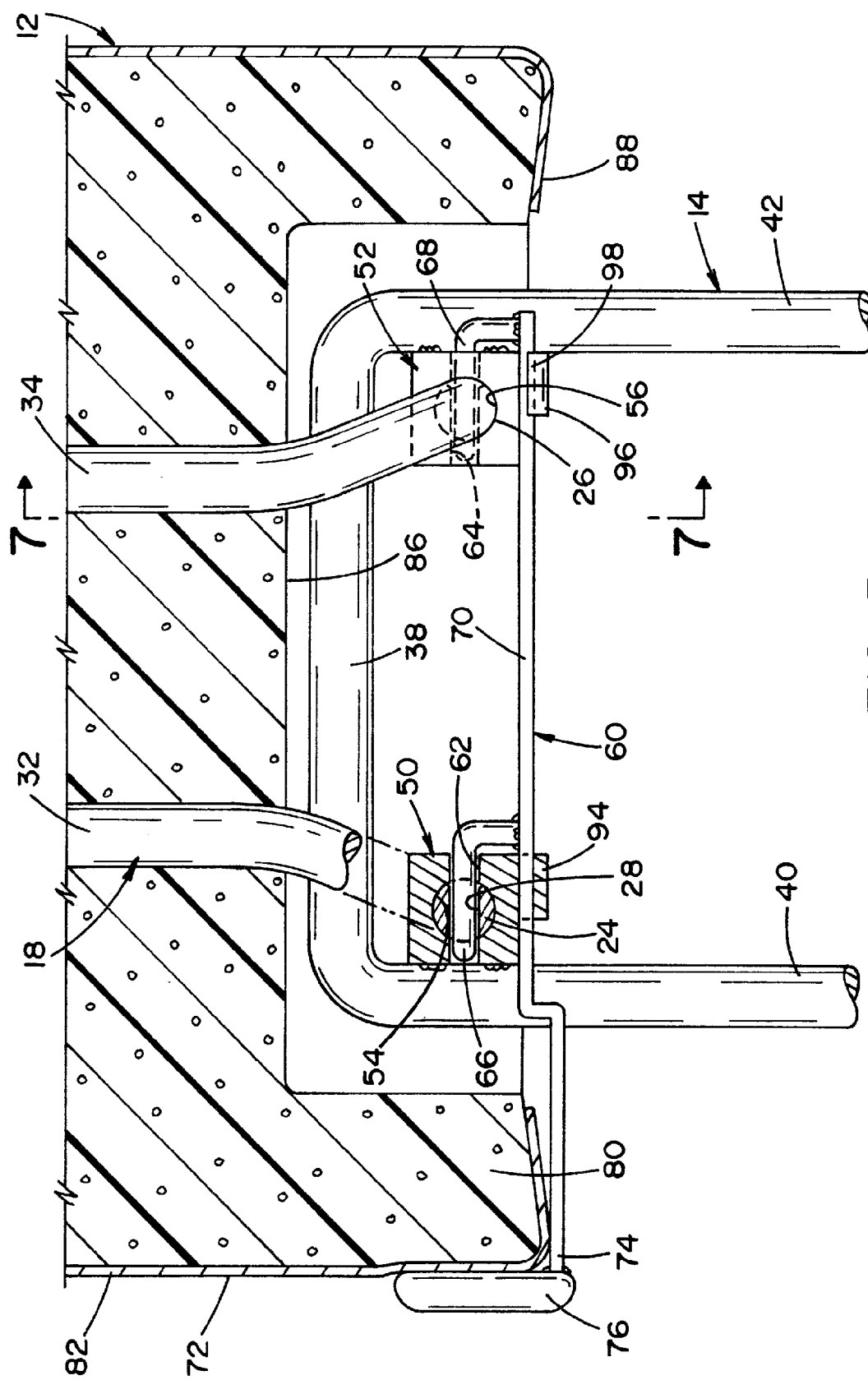
FIG. 5 is a partial cross sectional view of the head restraint assembly taken along the line 5-5 of FIG. 4 showing the locking device in a locked position wherein locking portions thereof are received through guides (one shown in cross section) of the lower frame assembly and through positioning apertures of the upper frame assembly.

With continued reference to FIG. 5, the locking device 60 can include an actuator rod or member 70 extending from a lateral side 72 of the head restraint body 12 toward the upper frame assembly 18. The actuator member 70 has the locking portions 66, 68 formed as spaced apart L-shaped branch members (i.e., the L-shaped branch members 66, 68 extend from the actuator member 70). These branch members 66, 68 are received within the locking apertures 62, 64 of the guides 50, 52 that are in registry with select ones of the positioning apertures 28 when the locking portions 66, 68 are received in the select ones of the apertures 28 to lock the head restraint body 12 in one of its plurality of longitudinal positions. An end 74 of the actuator rod adjacent the lateral side 72 of the head restraint body 12 can include an actuator button 76 that, when depressed, removes the locking portions 66, 68 from at least the set of positioning apertures 28 that are in registry with the locking apertures 62, 64 to allow longitudinal adjustment of the head restraint body 12.

More specifically, the locking device 60 can have a first locked position (shown in FIG. 5) wherein the L-shaped members 66, 68 are received through the respective locking apertures 62, 64 defined in each of the laterally spaced apart guides 50, 52 and respective ones of the plurality positioning apertures 28 defined along the guided portions 24, 26 of the upper frame assembly 18 to longitudinally lock the head restraint body 12, and a second unlocked position (shown in FIG. 6) wherein the L-shaped members 66, 68 are removed from the select ones of the plurality of positioning apertures 28 to allow longitudinal movement of the head restraint body 12. Accordingly, the locking device 60 is movable laterally between the first locked position of FIG. 5 wherein the locking portions 66, 68 are received in the select ones of the apertures 28 and the second unlocked position of FIG. 6 wherein the locking portions 66, 68 are removed from the select ones of the positioning apertures 28. While the locking apertures 62, 64 of the guides 50, 52 are shown extending all the way through the guides, this is not required. For example, the locking apertures 62, 64 could extend into the guides 50, 52 only until the locking aperture 62, 64 intersect with or protrude into the guiding apertures 54, 56.

In the illustrated embodiment, the locking device 60 is urged toward the locked position by resilient foam 80 disposed within the head restraint body 12. More particularly, in the illustrated embodiment, the head restraint body 12 includes the foam 80 contained within a trim cover 82 as is known and understood by those skilled in the art. In the illustrated embodiment, the actuator button 76 is urged toward a non-depressed position corresponding to the first locked position of the actuator member 70. That is, the foam 80 within the trim cover 82 biases the actuator button 76 toward its non-depressed position and thereby urges the locking device 60 toward the first locked position.

Figure 6:
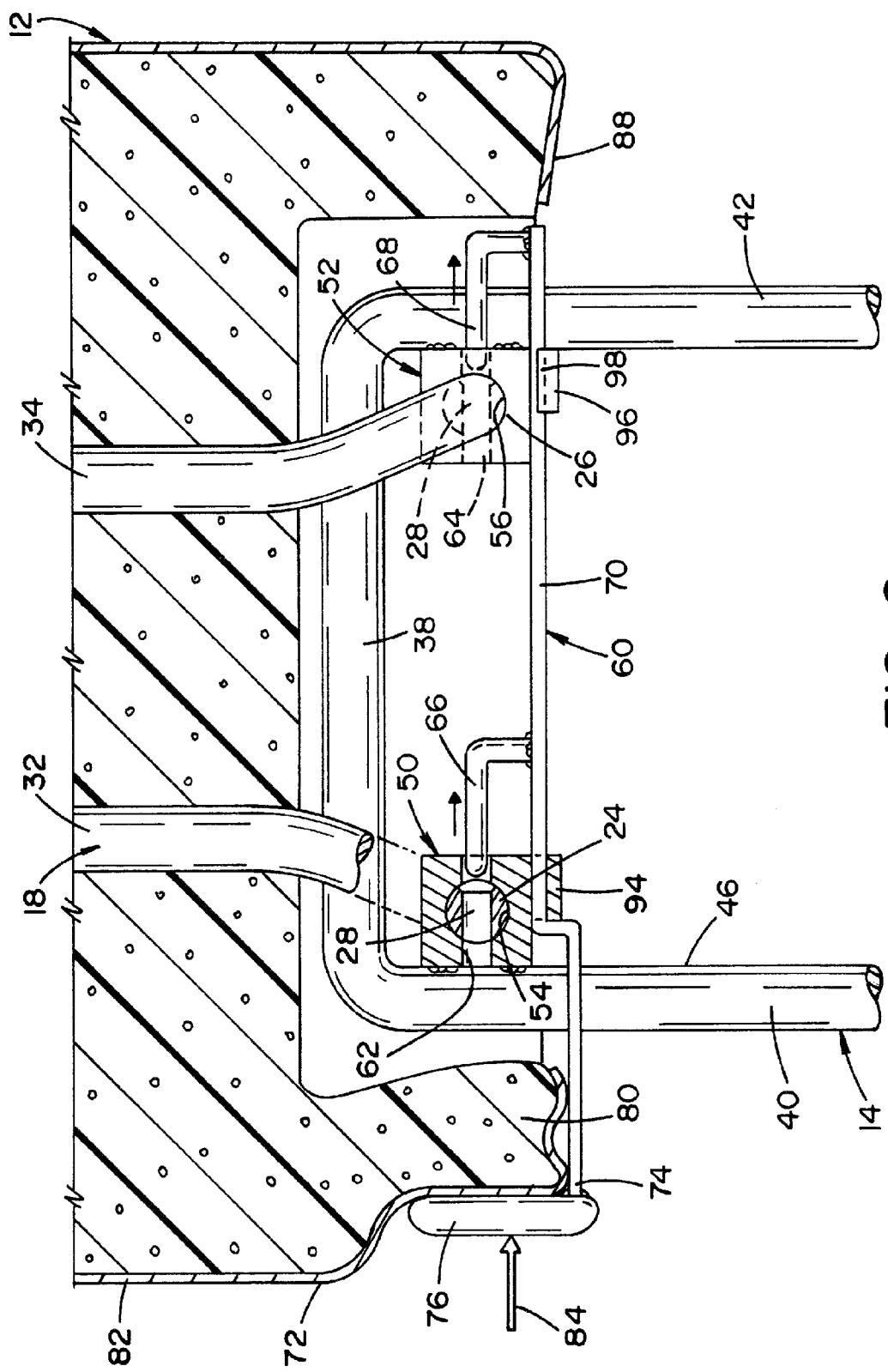
FIG. 6 is a cross sectional view of the head restraint assembly similar to FIG. 5, but showing the locking device moved to an unlocked position.

To move the locking device 60, and particularly the actuator member 70 thereof, to the second unlocked position of FIG. 6, a force is exerted on the actuator button 76 as indicated by arrow 84. Such force could be applied by a vehicle occupant, particularly a finger or fingers of the vehicle occupant. This causes the actuator member 70 to move (to the right in FIG. 6) and removes the locking portions 66, 68 from the apertures 28 of the upper frame assembly 18 thus allowing longitudinal adjustment of the head restraint body 12. Once the head restraint body 12 is longitudinally moved to a desired position, the force represented by arrow 84 can be removed from the actuator button 76 allowing the foam 80 to move the actuator button 76 and, in turn, the actuator member 70 back to the first locked position wherein the locking portions 66, 68 can be received in another select set of the apertures 28 of the upper frame assembly 18.

In the illustrated embodiment (FIG. 7), a recess 86 is formed in an underside 88 of the head restraint body 12 for accommodating the cooperating relationship between the upper frame assembly 18 and the lower frame assembly 14, as well as improving aesthetics by at least partially hiding the cooperating engagement between the upper and lower frame assemblies 14, 18. As shown in the illustrated embodiment, the base portion 38 of the lower frame assembly 14 is received or disposed within the recess 86 of the head restraint body 12 and the spaced apart legs 40, 42 extending from the base portion 38 depend from the underside 88 of the head restraint body 12 for mounting the head restraint body 12 to the associated vehicle structure, such as vehicle seat 16. The legs 32, 34 of the upper frame assembly 18 depend from the base portion 36 and extend into the recess 86. The guided portions 24, 26 extending from the legs 32, 34 are also accommodated or received within the recess 86. In addition, the guides 50, 52 can be received within the recess 86, all of which improves the aesthetics of the head restraint assembly 10.

Figure 7:
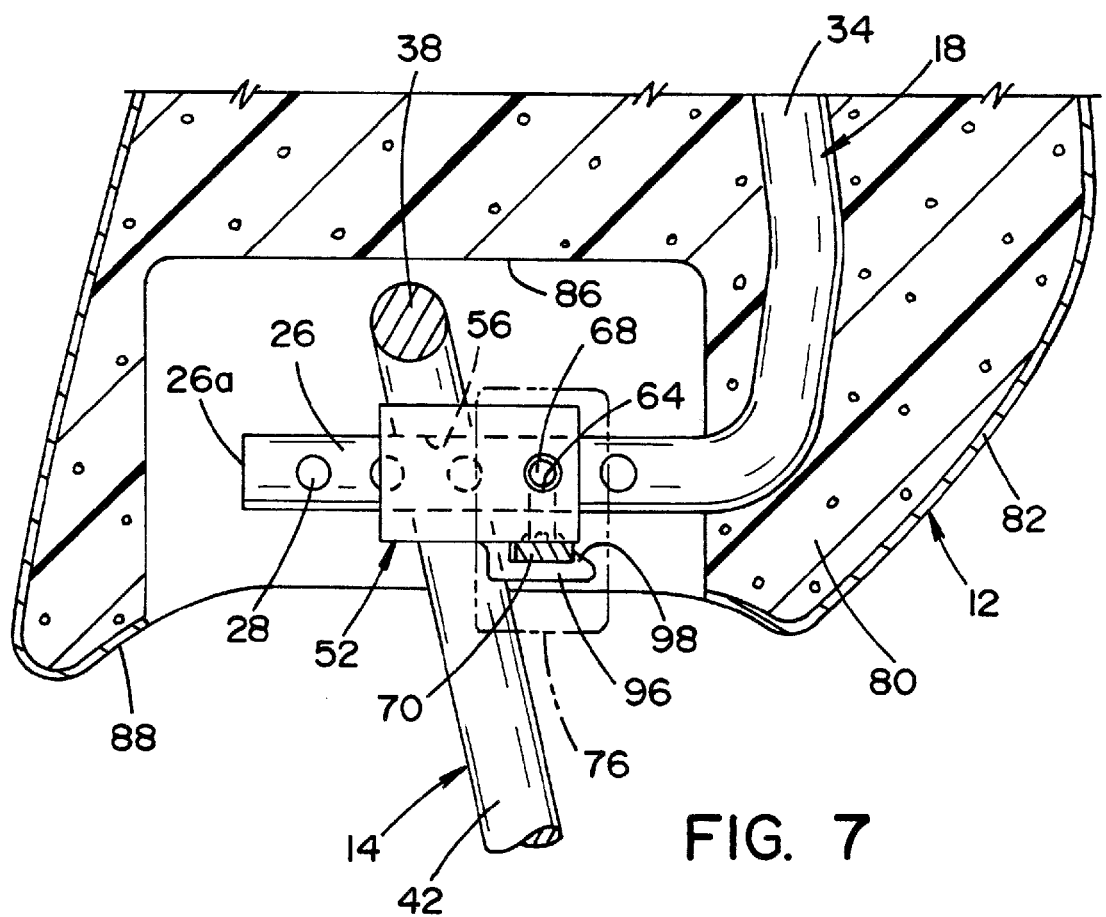
FIG. 7 is a crossed sectional view of the head restraint assembly taken along the lines 7-7 of FIG. 5.
Figure 8:
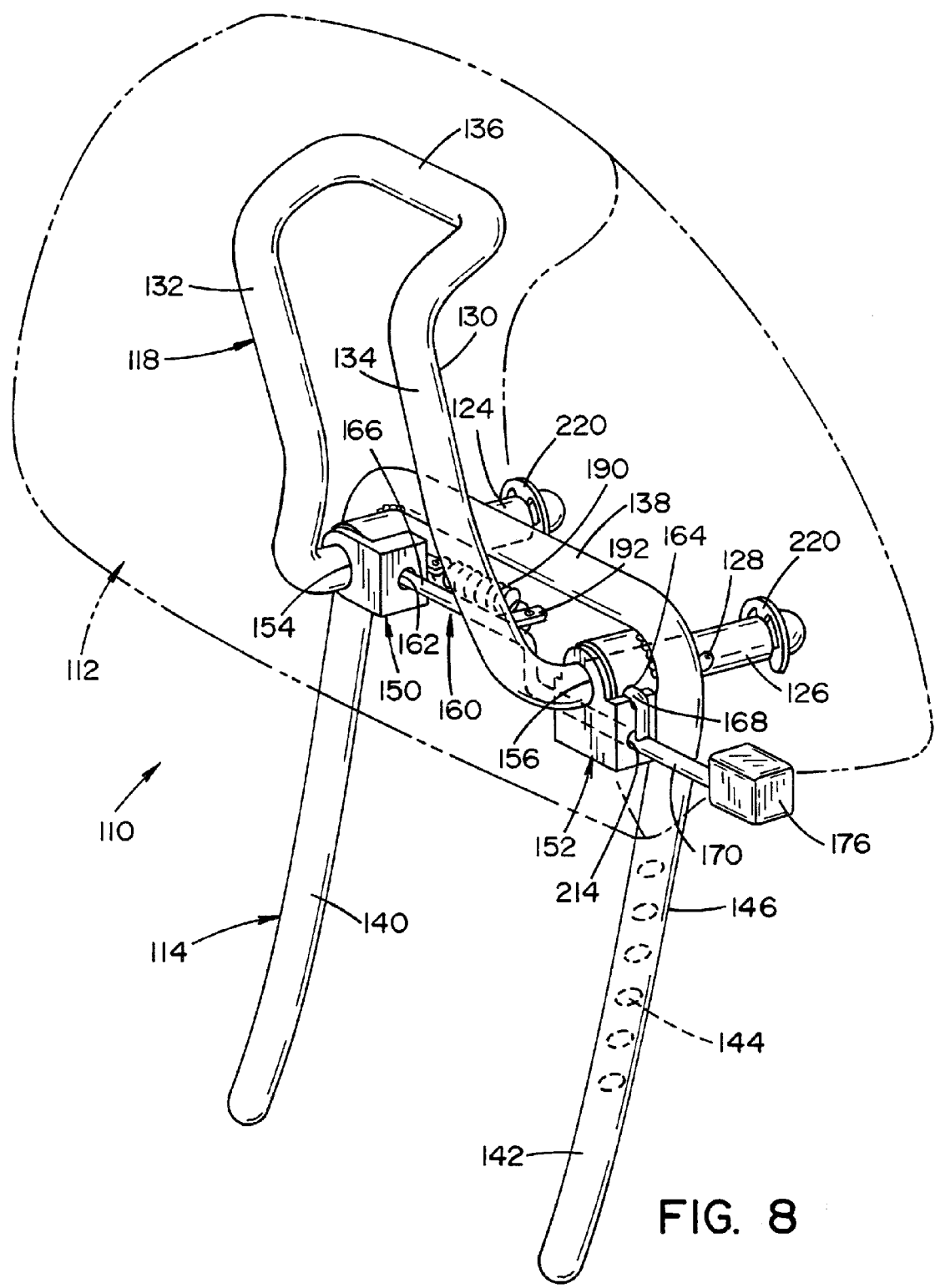
FIG. 8 is a perspective view of an upper frame assembly, a lower frame assembly and a locking device for a longitudinally adjustable vehicle head restraint assembly according to an alternate embodiment.
Figure 9:
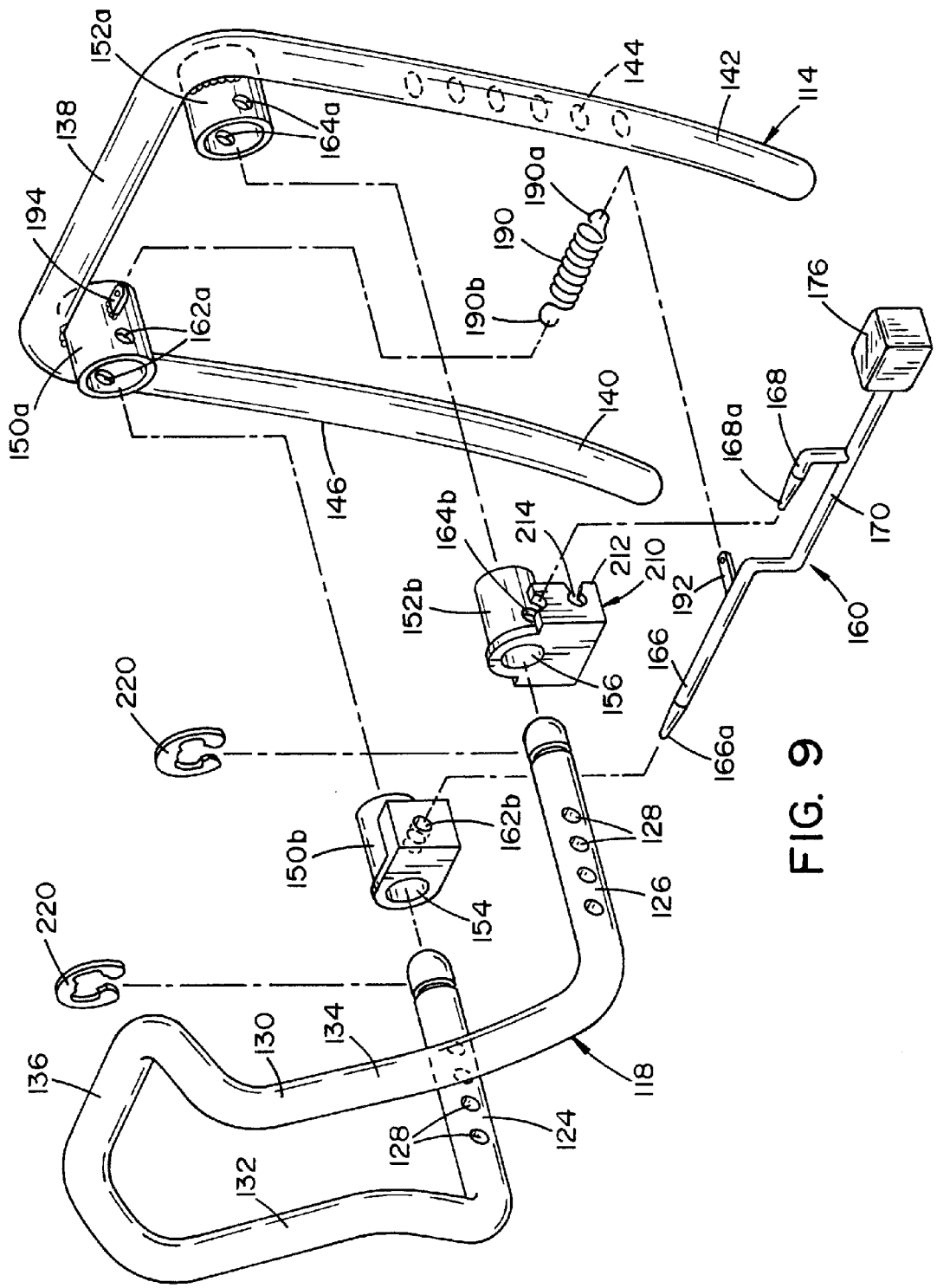
FIG. 9 is an exploded view of the upper frame assembly, the lower frame assembly, and the locking device of FIG. 8.
Figure 10:
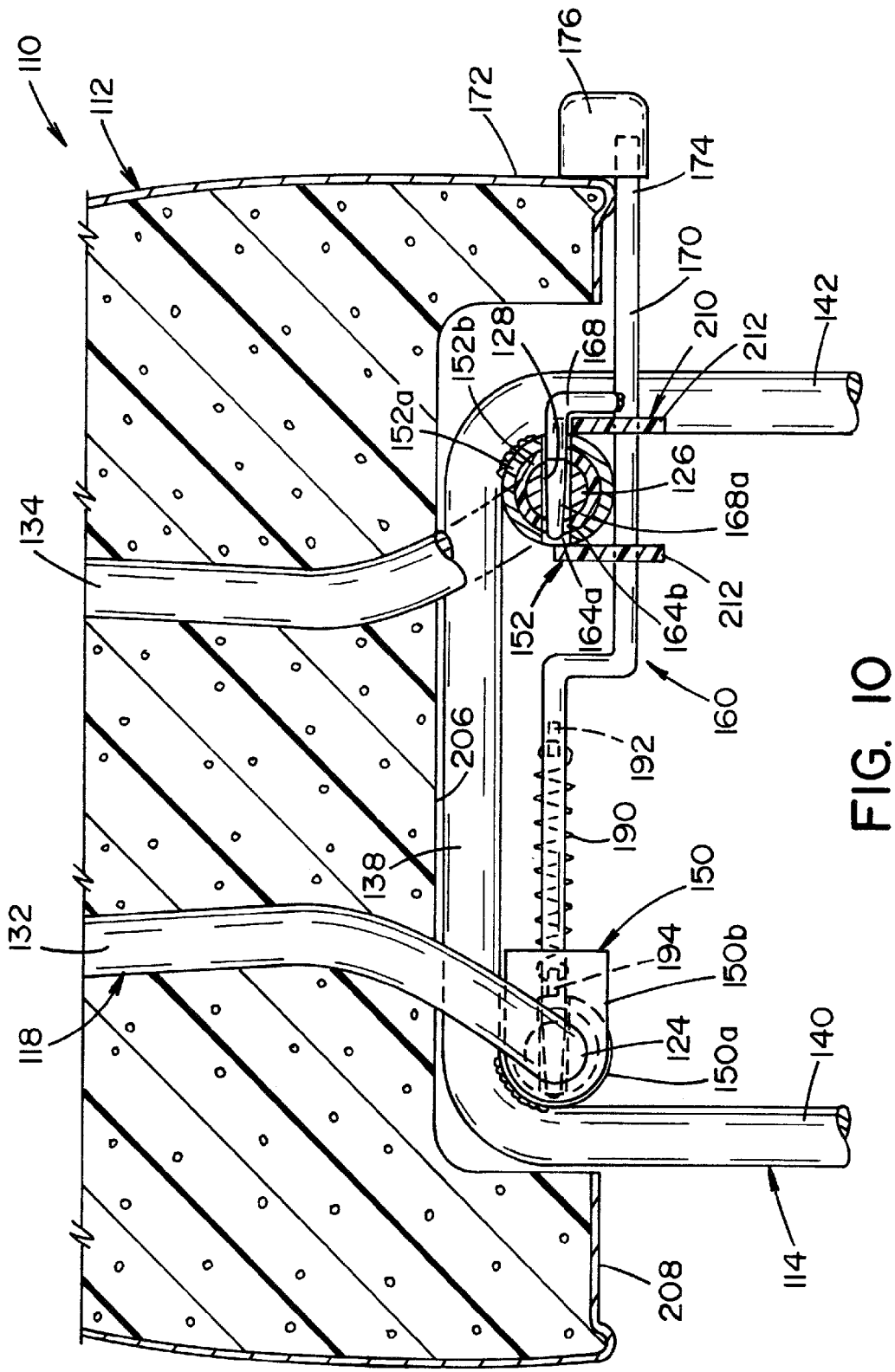
FIG. 10 is a partial cross sectional view of a longitudinally adjustable vehicle head restraint assembly having the upper frame assembly, the lower frame assembly, and the locking device of FIG. 8, the locking device shown in locked position.

With additional reference to FIG. 7, the guides 50, 52 can include locking device guiding portions 94, 96. As shown, each guiding portion 94, 96 can be formed as an L-shaped member having a barb or protrusion 98 formed at a distal end thereof for locking the actuator member 70 in sliding relation relative to the guides 50, 52. These guides 94, 96 though not required, facilitate sliding movement of the actuator member 70 between its locked position and unlocked position.

With reference to FIGS. 8-11, a longitudinally adjustable head restraint assembly 110 for a vehicle is shown according to an alternate embodiment. The vehicle head restraint assembly 110 can be the same or similar to the head restraint assembly 10 of FIGS. 1-7, except as indicated below. Like the head restraint assembly 10, the restraint assembly 110 includes a head restraint body 112 for providing support to a vehicle occupant's head (not shown). The head restraint assembly 110 further includes a lower frame assembly 114 provided for mounting the head restraint body 112 to an associated vehicle structure (e.g., vehicle seat 16 shown in FIGS. 3 and 4). Like the head restraint body 12, the head restraint body 112 is longitudinally adjustable relative to the lower frame assembly 114.

Also like the head restraint assembly 10, the head restraint assembly 110 includes an upper frame assembly 118 secured to the head restraint body 112 and movably secured to the lower frame assembly 114 for longitudinally adjusting the head restraint body 112 relative to the lower frame assembly 114. In particular, in the embodiment illustrated in FIGS. 8-11, the upper frame assembly 118 is longitudinally adjustable relative to the lower frame assembly 114 for longitudinally adjusting the head restraint body 112. As shown, the upper frame assembly 118 can be disposed at least partially within the head restraint body 112.

The upper frame assembly 118 can be the same or similar as the upper frame assembly 18. More particularly, as shown, the upper frame assembly 118 can include at least one guided portion 124, 126 having a plurality of positioning apertures 128 defined therealong corresponding to longitudinal positions of the head restraint body 112. In the embodiment illustrated in FIGS. 8-11, the upper frame assembly 118 includes a pair of spaced apart longitudinally elongated guided portions 124, 126 and the guided portions include corresponding pairs of positioning apertures 128 defined therealong. The guided portions 124, 126 can be connected together by a generally inverted U-shaped member 130 including leg portions 132, 134 and a base or cross-portion 136. As shown, the upper frame assembly 118 can be formed by a single member, such as the depicted member having a round cross-section, though other shapes, configurations and compositions could also be used and the upper frame assembly 118 need not be formed by a single piece.

The lower frame assembly 114 can be the same or similar as the lower frame assembly 14. More particularly, the lower frame assembly 114 can include at least one leg 140, 142 for mounting the head restraint body 112 and the upper frame assembly 118 to the associated vehicle structure (e.g., vehicle seat 16). In the embodiment illustrated in FIGS. 8-11, the at least one leg of the lower frame assembly 114 is a pair of spaced apart vertically extending legs 140, 142, though this is not required. The legs 140, 142 depend from an underside of the head restraint body 112 when the lower frame assembly is movably secured to the upper frame assembly 118 to mount the head restraint body 112 to the associated vehicle structure. As shown, the lower frame assembly 114 can be the same or similar in shape as the frame assembly 14. That is, the lower frame assembly 114 can be a generally U-shaped member with a base or cross-portion 138 and two spaced apart legs 140, 142 extending from the base portion 138.

At least one of the spaced apart legs 140, 142 (e.g., leg 142 in the embodiment illustrated in FIGS. 8-11) can have a plurality of positioning apertures 144 defined therealong for adjusting a vertical position of the head restraint body 112 relative to the associated vehicle structure. The positioning apertures 144 can correspond to vertical positions of the head restraint body 112. While the apertures 144 are only defined in the leg 142 of the embodiment illustrated in FIGS. 8-11, it is to be appreciated that other configurations are possible (e.g., apertures could be provided in leg 140 instead or in addition to the apertures 144 defined in the leg 142). The apertures 144 can be recesses, slots, detents or the like defined into the leg 142 for adjusting the vertical position of the head restraint body 112 relative to an associated vehicle structure, such as a vehicle seat, as is known and understood by those skilled in the art. Together, the base portion 138 and the legs 140, 142 form an inverted U-shaped member 146 that can be formed as described in reference to the U-shaped members 30, 46 and 118, though this is not required and other configurations and constructions are contemplated.

The lower frame assembly 114 can additionally include at least one guide 150, 152 defining a guiding aperture 154, 156 for receiving the at least one guided portion 124, 126 of the upper frame assembly 118 to guide longitudinal movement of the head restraint body 112. In particular, in the embodiment illustrated in FIGS. 8-11, the at least one guide of the lower frame assembly 114 includes a pair of laterally spaced apart guides 150, 152 each defining a respective guiding aperture 154, 156. In particular, the guides 150, 152 define the guiding apertures 154, 156 as longitudinally elongated apertures or slots. As will be described in more detail below, the guided portions 124, 126 of the upper frame assembly 118 are respectively received in the guiding apertures 154, 156 of the guides 150, 152. As shown, the guides 150, 152 can be respectfully disposed at or adjacent intersections of the base portion 138 and each of the spaced apart legs 140, 142.

More particularly, in the embodiment illustrated in FIGS. 8-11, the guides 150, 152 can include tubular housing portions 150a, 152a that are secured at or adjacent intersections of the base portion 138 and each of the spaced apart leg portions 140, 142. For example, the tubular housings 150a, 152a can be welded to the legs 140, 142 and the base portion 138 at respective intersections between or formed by the base portion 138 and the legs 140, 142. The guides 150, 152 can further include insert portions 150b, 152b that are received within respective tubular portions 150a, 152a. In one embodiment, the insert portions 150b, 152b are formed of plastic and are press-fit within steel housing portions 150a, 152a.

Longitudinal movement of the head restraint body 112 having the upper frame assembly 118 mounted thereto can be the same as the head restraint body 12 having the upper frame assembly 18 mounted thereto, as illustrated in FIGS. 3 and 4. Like the head restraint body 12, the arrangement depicted in FIGS. 8-11 allows an adjustment to be applied to the head restraint body 112 that enables the head restraint body 112 to have multiple forward/rearward longitudinal adjustments to improve comfort for a vehicle occupant. By the provision of a longitudinal adjustment for the head restraint assembly 110, the head restraint body 112 is adjustable according to vehicle occupant preferences and sizes and need not be fixed at a longitudinal position designated according to the average-sized vehicle occupant. Longitudinal adjustment particularly allows the head restraint body 112 to be adjusted closer or farther away from a vehicle occupant's head to achieve a comfortable position.

Like the head restraint assembly 10, the head restraint assembly 110 can additionally include a locking device 160 for longitudinally locking the head restraint body 112 and the upper frame assembly 118 relative to the lower frame assembly 114. In particular, the locking device 160 can lock the head restraint body 112 in one of a plurality of longitudinal positions by engaging one set of the plurality of positioning apertures 128 of the upper frame assembly 118. For such longitudinal locking, the at least one guide of the lower frame assembly 114 (i.e., guides 150, 152) can include a locking aperture (i.e., locking apertures 162, 164) and the locking device 160 can include at least one locking portion 166, 168 received through the locking aperture of the at least one guide and into one of the plurality of positioning apertures 128 that is in registry with the locking aperture. More particularly, in the embodiment illustrated in FIGS. 8-11, the locking device 160 can include laterally spaced apart locking portions 166, 168 that are respectively received in select ones of the plurality of positioning apertures 128 defined along the laterally spaced apart guided portions 124, 126 of the upper frame assembly 118. As shown, distal ends 166a, 168a of the locking portions can be tapered to facilitate easier entry of the locking portions 166, 168 into the locking apertures 162, 164.

The locking apertures 162, 164 can be formed by aperture portions of the guide portions. More particularly, the locking aperture 162 can be formed by apertures 162a defined in the housing portion 150a and apertures 162b of the insert portion 150b. Likewise, the locking aperture 164 can be formed by apertures 164a defined in the housing portion 152a and apertures 164b defined in the insert portion 152b. The apertures 162a, 162b and 164a, 164b, respectively, are in registry when the insert portions 150b, 152b are inserted and assembled in the housing portions 150a, 152a.

The locking device 160 can include an actuator rod or member 170 extending from a lateral side 172 of a head restraint body 112 toward the upper frame assembly 118. The actuator member 170 has the locking portions 166, 168 formed as spaced apart L-shaped branch members (i.e., the L-shaped branch members 166, 168 extend from the actuator member 170). These branch members 166, 168 are received within the locking apertures 162, 164 of the guides 150, 152 that are in registry with select ones of the positioning apertures 128 when the locking portions 166, 168 are received in the select ones of the apertures 128 to lock the head restraint body 112 in one of its plurality of longitudinal positions. An end 174 of the actuator rod adjacent the lateral side 172 of the head restraint body 112 can include an actuator knob 176 that, when pulled, removes the locking portions 166, 168 from at least the set of positioning apertures 128 that are in registry with the locking apertures 162, 164 to allow longitudinal adjustment of the head restraint body 112.

More specifically, the locking device 160 can have a first lock position (shown in FIG. 10) wherein the L-shaped members 166, 168 are received through the respective locking apertures 162, 164 defined in each of the laterally spaced apart guides 150, 152 and respective ones of the plurality of positioning apertures 128 defined along the guided portions 124, 126 of the upper frame assembly 118 to longitudinally lock the head restraint body 112, and a second unlock position (shown in FIG. 11) wherein the L-shaped members 166, 168 are removed from the select ones of the plurality of positioning apertures 28 to allow longitudinal movement of the head restraint body 112. Accordingly, the locking device 160 is movably laterally between the first lock position in FIG. 10 wherein the locking portions 166, 168 are received in the select ones of the apertures 128 and the second unlock position of FIG. 11 wherein the locking portions 166, 168 are removed from the select ones of the positioning apertures 128. While the locking apertures 162, 164 of the guides 150, 152 are shown extending all the way through the guides, this is not required. For example, the locking apertures 162, 164 could extend into the guides 150, 152 only until the locking apertures 162, 164 intersect with or protrude into the guiding apertures 154, 156.

In the embodiment illustrated in FIGS. 8-11, the locking device 160 is urged toward the locked position by a biasing mechanism, such as spring 190. The spring 190 has a first end 190a secured to the locking mechanism 160 and a second end 190b secured to the guide 150, and particularly to the housing portion 150a of the guide 150. More particularly, in the embodiment illustrated in FIGS. 8-11, the first end 190a is secured to an extension member 192 protruding from the locking mechanism 160, and particularly from the locking portion 166, though other attachment locations are possible. The second end 190b is secured to an extension portion 194 protruding from an inner side of the housing portion 150a. The force of the spring 190 urges the locking mechanism 160 toward the locked position illustrated in FIG. 10 wherein the locking portions 166, 168 are urged into the respective locking apertures 162, 164 and further into select ones of the positioning apertures 128 when such positioning apertures 128 are in registry with the locking apertures 162, 164.

Figure 11:
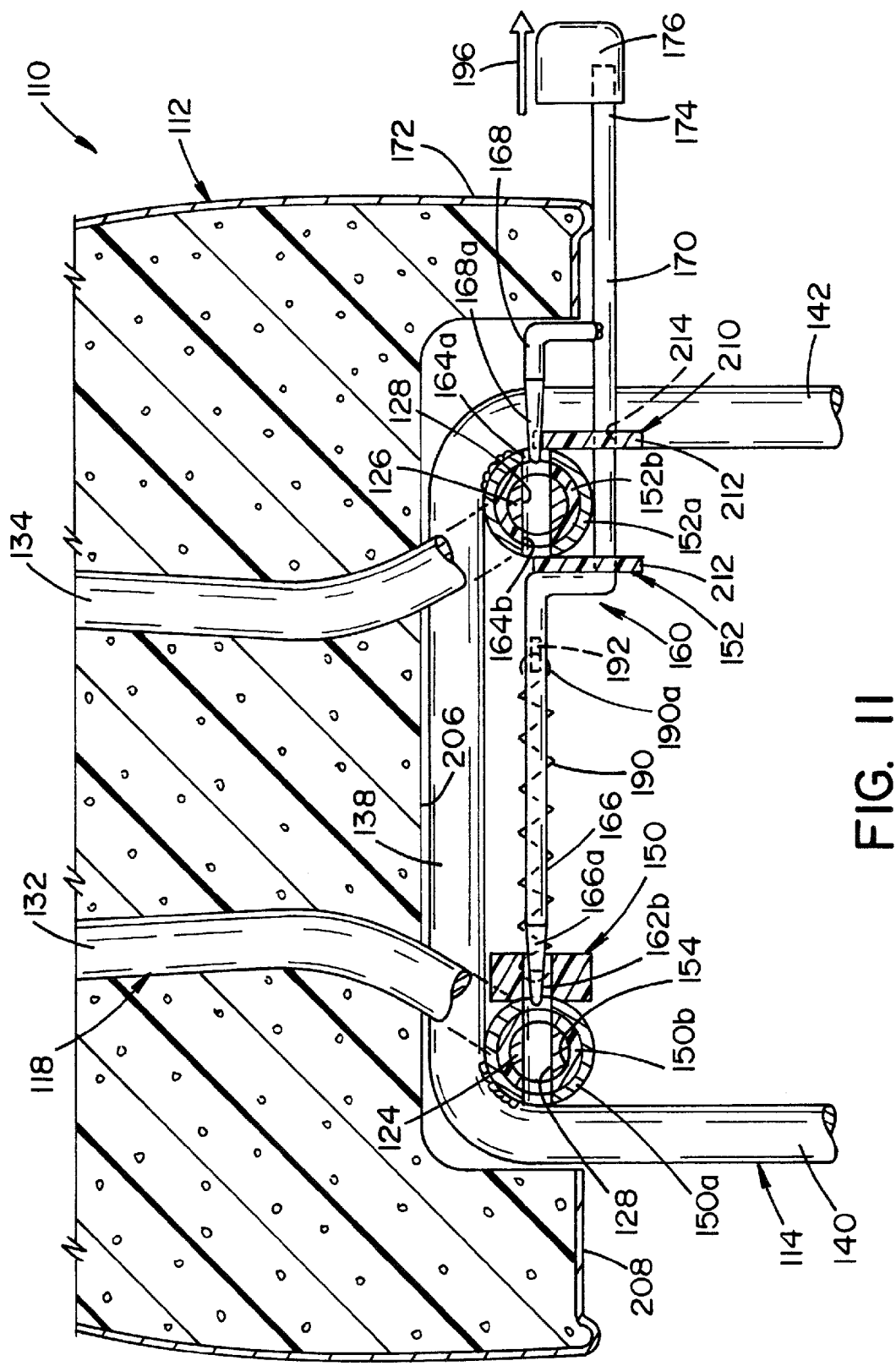
FIG. 11 is a partial cross sectional view similar to FIG. 10, but showing the locking device moved to an unlocked position.

To move the locking device 160, and particularly the actuator member 170 thereof, to the second unlocked position of FIG. 11, a force is exerted on the actuator knob 176 as indicated by the arrow 196 that is sufficient to overcome the urging of the spring 190. Such force could be applied by a vehicle occupant, particularly a finger or fingers of the vehicle occupant. This causes the actuator member 170 to move (to the right in FIG. 11) and remove the locking portions 166, 168 from the apertures 128 of the upper frame assembly 118 thus allowing longitudinal adjustment of the head restraint body 112. Once the head restraint body 112 is longitudinally moved to a desired position, the force represented by the arrow 196 can be removed from the actuator knob 176 allowing the spring 190 to move the actuator knob 176 and, in turn, the actuator member 170 back to the first locked position wherein the locking portions 166, 168 can be received in another select set of the apertures 128 of the upper frame assembly 118.

As with the restraint assembly 10, the restraint assembly 110 can have a recess 206 formed in an underside 208 of the head restraint body 112 for accommodating the cooperative relationship between the upper frame assembly 118 and the lower frame assembly 114, as well as improving aesthetics by at least partially hiding the cooperating engagement between the upper and lower frame assemblies 114, 118. As shown in the embodiment illustrated in FIGS. 8-11, the base portion 138 of the lower frame assembly 114 is received or disposed within the recess 206 of the head restraint body 112 and the spaced apart legs 140, 142 extending from the base portion 138 depend from the underside 208 of the head restraint body 112 for mounting the head restraint body 112 to the associated vehicle structure, such as a vehicle seat. The legs 132, 134 of the upper frame assembly 118 depend from the base portion 138 and extend into the recess 206. The guided portions 124, 126 extending from the legs 132, 134 are also accommodated or received within the recess 206. In addition, the guides 150, 152 can be received within the recess 206, all of which improves the esthetics of the head restraint assembly 110.

In the embodiment illustrated in FIGS. 8-11, at least one of the guides, such as guide 152, can include a locking device guiding portion 210. As shown, the locking device guiding portion 210 can be a depending portion of the guide insert 152b having a pair of legs 212 defining slots 214 that receive the actuator member 170 therein. This arrangement can allow lateral sliding movement of the locking device 160 while holding the locking device 160 in positioning under the head restraint body 112. Additionally, lock rings 220 can be installed on distal ends of the guided portions 124, 126 to prevent the guided portions 124, 126 from being removed from the guides 150, 152.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle head restraint assembly, comprising:
   a head restraint body for providing support to a vehicle occupant's head;
   a lower frame assembly for mounting said head restraint body to an associated vehicle structure, said head restraint body longitudinally adjustable relative to said lower frame assembly in a forward or rearward direction with respect to the associated vehicle structure, wherein said lower frame assembly includes at least one guide defining a guiding aperture and a locking aperture defined in said at least one guide;
   an upper frame assembly secured to said head restraint body and movably secured to said lower frame assembly for longitudinally adjusting said head restraint body relative to said lower frame assembly, said upper frame assembly including at least one guided portion having a plurality of positioning apertures defined therealong, said at least one guided portion received in said guiding aperture to guide longitudinal movement of said head restraint body; and
   a locking device that locks said head restraint body by engaging one of said plurality of positioning apertures, said locking device including a locking portion received through said locking aperture and into one of said plurality of positioning apertures that is in registry with said locking aperture.

2. The vehicle head restraint assembly of claim 1 wherein said locking device includes an actuator rod extending from a lateral side of said head restraint body toward said upper frame assembly, said locking portion formed as an L-shaped branch member extending from said actuator rod.

3. The vehicle head restraint assembly of claim 2 wherein an end of said actuator rod adjacent said lateral side of said head restraint body includes an actuator that, when actuated, removes said locking portion from said one of said plurality of position apertures to allow longitudinal adjustment of said head restraint body, said actuator button urged toward a non-actuated position.

4. The vehicle head restraint assembly of claim 3 wherein said actuator is an actuator button that is actuated by depression thereof and said head restraint body includes foam contained within a trim cover, said foam biasing said actuator button toward said non-actuated position.

5. The vehicle head restraint assembly of claim 3 wherein said actuator is an actuator button that is actuated by pulling thereof, said actuator member biased toward said non-actuated position by a spring.

6. The vehicle head restraint assembly of claim 1 wherein said at least one guide includes a pair of laterally spaced apart guides each defining a respective guiding aperture as a longitudinally elongated aperture, and said at least one guided portion includes a pair of spaced apart longitudinally elongated guided portions, which are respectively received in said guiding apertures.

7. The vehicle head restraint assembly of claim 6 further including a locking device including an actuator member having spaced apart L-shaped members, said locking device having a first locked position wherein said L-shaped members are received through respective locking apertures defined in each of said laterally spaced apart guides and respective ones of a plurality of positioning apertures defined along said guided portions to longitudinally lock said head restraint body, and a second unlocked position wherein said L-shaped members are removed from said ones of said plurality of positioning apertures to allow relative longitudinal movement of said head restraint body.

8. The vehicle head restraint assembly of claim 1 wherein said lower frame assembly include at least one leg depending from an underside of said head restraint body to mount said head restraint body to the associated vehicle structure.

9. The vehicle head restraint assembly of claim 8 wherein said at least one leg is a pair of spaced apart vertically extending legs, at least one of which has a plurality of apertures defined therealong for adjusting a vertical position of said head restraint body relative to the associated vehicle structure.

10. A longitudinally adjustable head restraint assembly for a vehicle, comprising:
    a head restraint body having an upper frame assembly;
    a lower frame assembly for mounting said head restraint body, said upper frame assembly longitudinally adjustable relative to said lower frame assembly in a forward or rearward direction with respect to the vehicle for longitudinally adjusting said head restraint body; and
    a locking device for longitudinally locking said head restraint body and said upper frame assembly relative to said lower frame assembly, said locking device including laterally spaced apart locking portions that are respectively received in select ones of a plurality of positioning apertures defined along laterally spaced apart guided portions of said upper frame assembly,
    wherein said lower frame assembly includes guides through which said laterally spaced apart guided portions are received, said guides having locking apertures defined therein that are in registry with said select ones of said positioning apertures when said locking portions are received in said select ones of said plurality of positioning apertures.

11. The head restraint assembly of claim 10 wherein said lower frame assembly is U-shaped with a base portion disposed within a recess of said head restraint body and two spaced apart legs extending from said base portion and depending from an underside of said head restraint body for mounting said head restraint body to an associated vehicle seat.

12. The head restraint assembly of claim 11 wherein said lower frame assembly includes a guides respectively disposed adjacent intersections of said base portion and each of said spaced apart legs, each of said guides defines a guiding aperture that receives a guiding leg portion of said upper frame assembly, said guiding leg portion longitudinally movable along said guiding aperture to longitudinally adjust said head restraint body.

13. A longitudinally adjustable head restraint assembly for a vehicle, comprising:
    a head restraint body having an upper frame assembly;
    a lower frame assembly for mounting said head restraint body, said upper frame assembly longitudinally adjustable relative to said lower frame assembly in a forward or rearward direction with respect to the vehicle for longitudinally adjusting said head restraint body; and
    a locking device for longitudinally locking said head restraint body and said upper frame assembly relative to said lower frame assembly, said locking device including laterally spaced apart locking portions that are respectively received in select ones of a plurality of positioning apertures defined along laterally spaced apart guided portions of said upper frame assembly,
    wherein said locking device is moveable laterally between a locked position wherein said locking portions are received in said select ones of said plurality of positioning apertures and an unlocked position wherein said locking portions are removed from said select ones of said plurality of positioning apertures, said locking device urged toward said locked position by resilient foam disposed in said head restraint body.

14. A head restraint assembly for a vehicle, comprising;
    a head restraint body for supporting a vehicle occupant's head;
    an upper frame assembly disposed at least partially within said head restraint body, said upper frame assembly including at least one guided portion having at least one positioning aperture defined therealong;
    a lower frame assembly mounting said head restraint body and said upper frame assembly to a vehicle seat, said lower frame assembly including at least one guide through which said at least one guided portion of said upper frame assembly is received, said at least one guide including at least one locking aperture, and wherein said upper frame assembly is movably mounted to said lower frame assembly for longitudinally adjusting a position of said head restraint body in a forward or rearward direction with respect to the vehicle relative to the vehicle seat; and
    a locking device movable laterally to pass through said at least one locking aperture and said at least one positioning aperture to lock a longitudinal position of the head restraint body.

* * * * *